Oct. 21, 1930.                A. W. WHEATON                1,778,739
                               PIPE COUPLING
                            Filed April 26, 1929          2 Sheets-Sheet 1

INVENTOR
Abram W. Wheaton,
BY
George D. Richards
ATTORNEY

Oct. 21, 1930.  A. W. WHEATON  1,778,739
PIPE COUPLING
Filed April 26, 1929  2 Sheets-Sheet 2
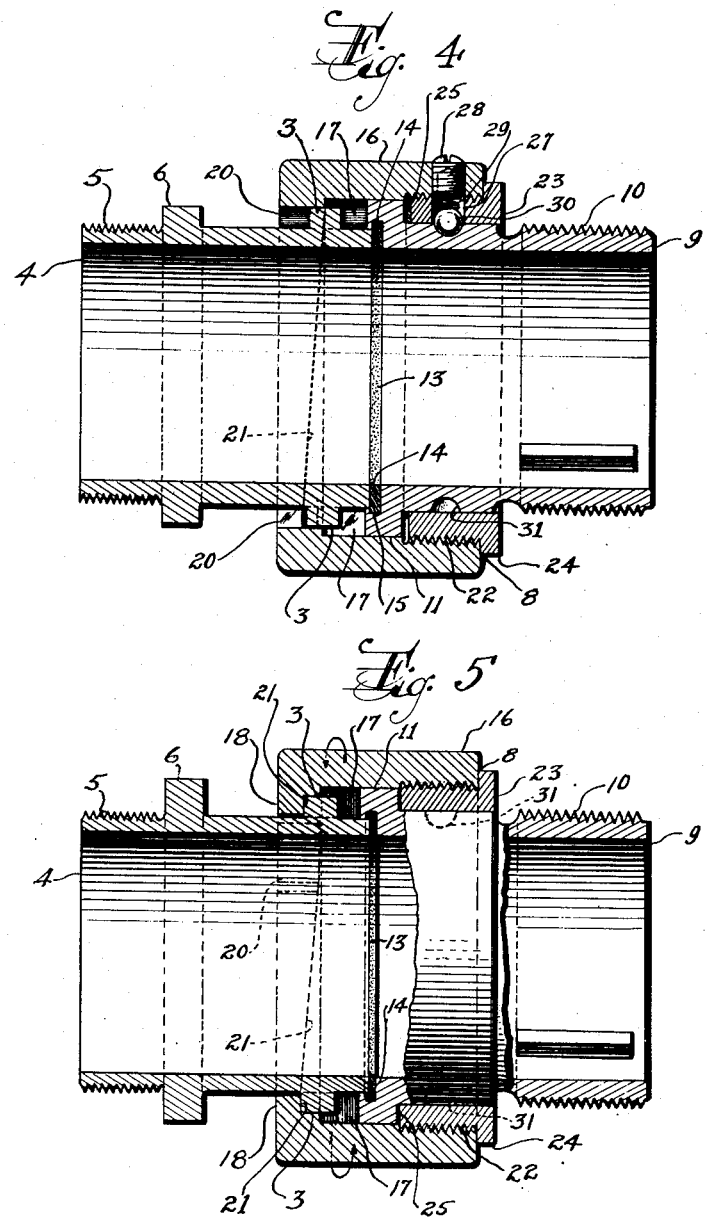
INVENTOR
Abram W. Wheaton,
BY
George D. Richards
ATTORNEY Patented Oct. 21, 1930

1,778,739

UNITED STATES PATENT OFFICE

ABRAM W. WHEATON, OF MAPLEWOOD, NEW JERSEY, ASSIGNOR TO A. W. WHEATON BRASS WORKS, OF NEWARK, NEW JERSEY, A CORPORATION OF NEW JERSEY

PIPE COUPLING

Application filed April 26, 1929. Serial No. 358,243.

This invention relates to improvements in couplings; and the invention has reference, more particularly, to a novel pipe coupling for connecting adjacent pipe sections.

The invention has for its principal object to provide a novel quick-acting pipe coupling for connecting adjacent pipe sections, which coupling comprises a minimum number of parts, is self-sealing as to the joint formed between the coupled parts, and which may be easily and quickly manipulated either to couple or uncouple the pipe sections.

The invention has for another object to provide means for moving the coupling elements axially into sealing relation and for preventing relative rotation of the elements so as not only to prolong the coupling life but to also prevent accidental disconnection of the coupled parts.

Other objects of this invention not at this time more particularly enumerated, will be clearly understood from the following detailed description of the same.

The invention is clearly illustrated in the accompanying drawings, in which:

Fig. 4 is a sectional view taken along line 4—4 of Fig. 1, and

Fig. 5 is a sectional view taken along line 5—5 of Fig. 2.

Similar characters of reference are employed in all of the hereinabove described views, to indicate corresponding parts.

Figure 1:
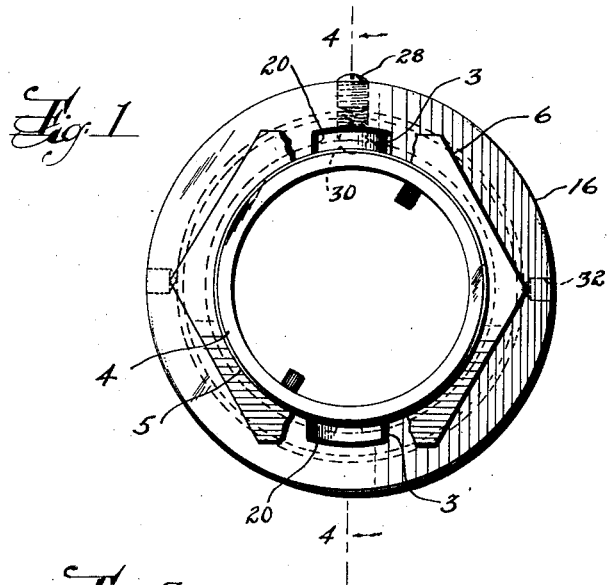
Fig. 1 is an end view with parts broken away of the novel coupling of this invention, the male and female members thereof being shown in assembled but unlocked relation.

Referring now to the said drawings, the novel quickly operated pipe coupling of this invention comprises cooperating male and female elements designated 4 and 8 respectively, which are adapted to be quickly and easily coupled and uncoupled. The male element 4 is of substantially hollow cylindrical form and has its outer end portion threaded externally at 5, which thread terminates inwardly adjacent a suitably formed nut flange 6 having a hexagonal or other appropriately shaped peripheral surface for receiving a wrench to be used in threading the male member into a pipe fitting or other receiving means of a pipe section. The male element 4 is provided near its inner end with a pair of diametrically arranged locking tongues or projections 3 which extend radially outward from the male element and have their outer sides preferably curved at 7.

The female element 8 is also of substantially hollow cylindrical construction and comprises a hollow hub member 9 having an outer threaded portion 10 adapted to be screwed into a pipe fitting or other receiving means of a pipe section. The inner end portion of the hub member 9 is outwardly offset, providing an external bearing boss 11, having an inner annular receiving socket 12 therewithin adapted to receive the inner end portion of the male element. Receiving socket 12 has a sealing gasket 13 at its inner end which gasket rests upon a shoulder 14 of the hub member 9. Preferably the bearing boss 11 is undercut slightly at 15 so as to accommodate and retain gasket 13. Bearing boss 11 is provided at its free end with a pair of diametrically opposite slots or splines 17 extending radially outwardly of socket 12, which slots conform to and are adapted to receive the locking tongues 3 of the male element when this element has its inner end portion inserted into the socket 12.

A lock collar or drum 16 surrounds the inner end of the hub member 9 and is rotatably mounted on the bearing boss 11 thereof. Lock collar 16 is formed with an inwardly directed annular flange 18 at one end thereof, the inner surface of which flange is adapted to slidably engage the free end of the bearing boss 11. Flange 18 is provided with a pair of diametrically opposed entrance ways or grooves 20 through which the locking tongues 3 are adapted to pass in order to enter the splines 17 of the bearing boss 11. A portion of the inner surface of the flange 18 is cut away to form two inclined planes 21, each of which inclined planes start adjacent one of the entrance ways 20 and extend around to the other entrance way. At the starting point the inclined planes are aligned with the inner surface of the flange 18 whereas at their ends these planes terminate well outwardly of the inner surfaces of this flange, as especially shown in Fig. 3.

The lock collar 16 is internally threaded at 26 for a portion of its length to receive a threaded sleeve 23 provided with a nut flange 24 for screwing this sleeve into the lock collar. Sleeve 23 is adapted to abut an annular shoulder 25 of the bearing boss 11 and cooperates with flange 18 to retain the lock collar upon the bearing boss.

A radial aperture 27 extends through the lock collar 16 and sleeve 23 and is illustrated as being in longitudinal alignment with one of the entrance ways 20. A hollow plug 28 is threaded into aperture 27 and by compressing a coil spring 29 therewithin, causes this spring to urge a positioning ball 30 toward the hub member 9 and as the lock collar is turned with respect to the hub 9 the ball 30 snaps into one or the other of two diametrically opposite semi-spherical recesses 31 provided in this hub member, as shown in Fig. 4, thereby tending to position the lock collar in either of two definite positions upon the hub 9. As each of the semi-spherical recesses 31 is longitudinally aligned with one of the splines 17, the positioning ball 30 when engaging one of these recesses positions the lock collar so that its entrance ways 20 are in longitudinal alignment with the splines 17, thereby enabling the ready insertion of the male element or its removal therefrom. The lock collar 16 is illustrated as provided with a plurality of recesses 32 adapted to receive a spanner wrench for turning the lock collar upon the hub 9.

Figure 3:
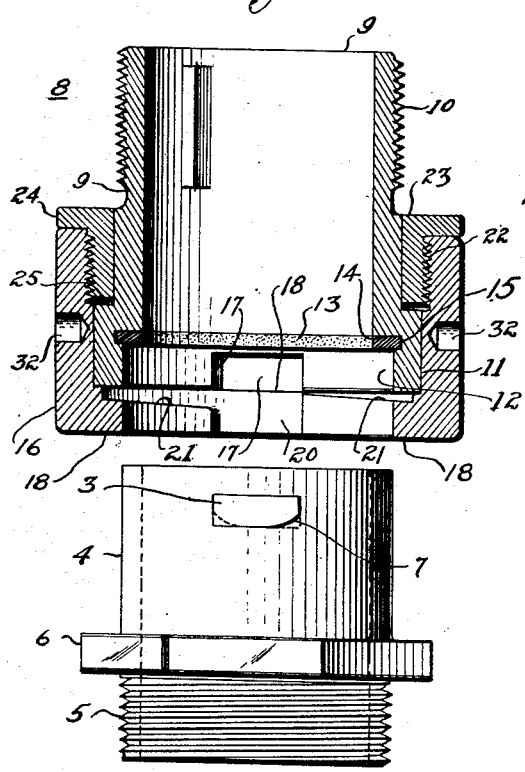
Fig. 3 is a plan view illustrating the positioning of the male and female elements prior to assembling the coupling, the female element being shown in half section.

With the male and female elements of the novel coupling separated as illustrated in Fig. 3, to assemble the coupling, the lock collar 16 is first turned upon the bearing boss 11 until the positioning ball 30 is felt to snap into one of the recesses 31 in which position the entrance ways 20 are in alignment with the splines 17. The male element may then be inserted axially into the female element so that the cylindrical inner end of the male element passes under flange 18 and into the receiving socket 12 while the locking tongues pass through entrance ways 20 and partially into splines 17. The parts of the coupling are now assembled and are ready to be locked together. The locking operation is performed by turning the lock collar 16 upon the bearing boss 11 so that the inclined planes 21 of the flange 18 ride over the curved portions 7 and the outer sides of the locking tongues 3. Owing to the inclination of the planes 21, as these planes move with respect to the tongues 3 they urge these tongues and hence the male element inwardly of the female element so that the inner end of the male element is forced into tight sealing relation with the sealing gasket 13. Any tendency of the tongues 3 to revolve with the inclined planes is prevented by the action of the splines 17 which permit the tongues 3 to move only axially of the coupling.

Figure 2:
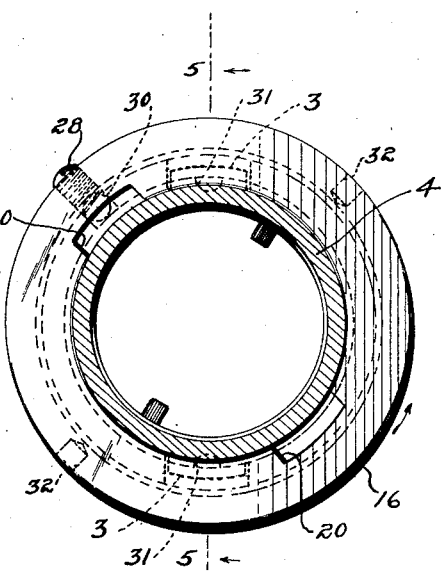
Fig. 2 is a view similar to Fig. 1 but shows the coupling members in assembled and locked relation.

By so conforming the motion of the tongues 3 and the male element to an axial movement, the gasket 13 is subjected merely to direct pressure from the male element without the application of any torsional forces which would tend to rapidly disintegrate the gasket. The arrows in Figs. 2 and 5 illustrate the direction of turning of the lock collar so as to effect the locking of the coupling. In thus locking the coupling, a spanner wrench applied to the apertures 32 will facilitate the locking operation.

Owing to the positioning of the locking tongues 3 at diametrically opposite points on the male element, the inclined planes 21 act to press simultaneously at opposite sides of the male element so as to force this element evenly, tightly and securely upon the gasket 13 so as to tightly squeeze this gasket between the male element and the shoulder 14 of the hub 9, whereby a fluid tight joint is effected between the male and female elements. The greater the turning of the lock collar 16 the tighter this joint will be. Owing to the relatively slight movement of tongues 3, as compared with the movement of the lock collar, the novel coupling has a high mechanical advantage so that but a slight force tending to turn the lock collar will result in a relatively large force urging the male element against the gasket 13. Also, this high mechanical advantage, due to the relatively slight inclination of planes 21, results in a positive and permanent fluid tight connection between male and female elements after connection, thereby eliminating any risk of loosening or accidentally disengaging the coupled parts, no matter how these parts may be jarred or vibrated. The permanent connection of the male and female elements is further enhanced by the action of splines 17 in preventing relative turning movement of these members.

It will be noted that the novel coupling is extremely compact and comprises but a minimum number of parts, so that not only is the same capable of economical production, but in use is under substantially no risk of becoming deranged, and yet the coupled parts may be readily and quickly uncoupled by turning the lock collar 16 in a reverse direction to that of the locking operation.

It will be apparent that a greater number than two locking tongues may be employed on the male element if desired, in which event there would be a corresponding increase in the number of ball seating recesses 31 and in splines and entrance ways.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. A coupling of the kind described, consisting of a male element having locking projections thereon, and a female element adapted to be quickly coupled to or uncoupled from said male element, said female element comprising a hub member, having axially extending splines therein adapted to receive said locking projections and an outwardly off-set annular bearing boss, a sealing gasket, carried by said hub member, and a lock collar rotatably mounted on said hub member, said lock collar having an annular flange overhanging the end of said hub member, said flange having entrance ways to receive said locking projections and inclined surfaces for cooperating with said locking projections, said inclined surfaces acting, upon relative rotation of said lock collar with respect to said hub member, to cause said locking projections to move inwardly of said splines and thereby effect engagement of said male element with said sealing gasket so as to produce a fluid tight joint between said male and female elements, and a sleeve secured to said lock collar to abut said bearing boss thereby retaining said locking means in operative assembled relation to said hub member.

2. A coupling of the kind described, consisting of a male element having locking projections thereon, and a female element adapted to be quickly coupled to and uncoupled from said male element, said female element comprising a hub member having axially extending splines therein adapted to receive said locking projections, a sealing gasket carried by said hub member, a lock collar having an annular flange overhanging the end of said hub member, said flange having entrance ways to receive said locking projections and inclined surfaces for cooperating with said locking projections, said inclined surfaces acting, upon relative rotation of said lock collar with respect to said hub member, to cause said locking projections to move inwardly of said splines and thereby effect engagement of said male element with said sealing gasket so as to produce a fluid tight joint between said male and female elements, and said lock collar having means for positioning said entrance ways in alignment with said splines so as to facilitate the ready insertion of said locking projections.

3. A coupling of the kind described, consisting of a male element having locking tongues thereon, and a female element comprising, a hub member provided with a receiving socket for receiving the free end portion of said male element, a sealing gasket positioned at the inner end of said receiving socket, a bearing boss formed on said hub member, said bearing boss being provided with axial splines for receiving said locking tongues, a lock collar rotatably mounted on said bearing boss, an annular flange formed on said lock collar and having inner inclined surfaces, said annular flange being provided with entrance ways for receiving said locking tongues, releasable catch means carried by said lock collar and cooperating with said hub member for positioning said lock collar on said bearing boss so that said entrance ways are aligned with said splines, to thereby enable the ready insertion of said locking tongues into said splines to assemble the male and female elements, said elements being locked together by turning said lock collar on said bearing boss to cause said inclined surfaces to engage said locking tongues and move said male element within the receiving socket into cooperating sealed relation with said sealing gasket, to thereby produce a fluid tight connection between said male and female elements.

4. A coupling of the class described, consisting of a male element having locking tongues formed thereon, and a female element comprising a hub member having an offset end providing an internal receiving socket and an external bearing boss having splines therein, and a lock collar rotatably mounted upon said bearing boss having locking tongue entrance ways and having inclined surfaces leading from said entrance ways for engaging said locking tongues to move said male element into cooperating abutting relation with the inner wall of said receiving socket, to thereby lock said male and female elements together, and said lock collar having yieldable means operative to position said splines and entrance ways in locking tongue receiving alignment.

In testimony, that I claim the invention set forth above I have hereunto set my hand this 23d day of April, 1929.

ABRAM W. WHEATON.